(12) United States Patent
Brown et al.

(10) Patent No.: US 11,858,825 B2
(45) Date of Patent: Jan. 2, 2024

(54) PREPARATION OF ACID-DEFICIENT URANYL NITRATE SOLUTIONS

(71) Applicant: X ENERGY, LLC, Rockville, MD (US)

(72) Inventors: Daniel Brown, Knoxville, TN (US); Nicholas Linneen, Knoxville, TN (US)

(73) Assignee: X Energy, LLC, Rockville, MD (US)

( * ) Notice: Subject to any disclaimer, the term of this patent is extended or adjusted under 35 U.S.C. 154(b) by 683 days.

(21) Appl. No.: 17/088,784

(22) Filed: Nov. 4, 2020

(65) Prior Publication Data

US 2021/0130181 A1 May 6, 2021

Related U.S. Application Data

(60) Provisional application No. 62/930,172, filed on Nov. 4, 2019.

(51) Int. Cl.
*C01F 17/00* (2020.01)
*C01F 17/276* (2020.01)

(52) U.S. Cl.
CPC .................... *C01F 17/276* (2020.01)

(58) Field of Classification Search
CPC .................................................. C01F 17/276
See application file for complete search history.

(56) References Cited

U.S. PATENT DOCUMENTS

| | | | |
|---|---|---|---|
| 3,361,676 A | 1/1968 | Mcbride et al. | |
| 3,401,122 A | 9/1968 | Cogliati et al. | |
| 3,800,023 A | 3/1974 | Haas | |
| 4,070,438 A | 1/1978 | Notz et al. | |
| 4,727,231 A | 2/1988 | Hayano et al. | |
| 7,628,970 B2 | 12/2009 | Takahashi | |
| 9,330,795 B2 | 5/2016 | Picart et al. | |

FOREIGN PATENT DOCUMENTS

| | | |
|---|---|---|
| CN | 103474114 B | 12/2013 |
| CN | 106564956 A | 4/2017 |
| CN | 106629854 B | 12/2017 |
| CN | 109592714 A | 4/2019 |
| CN | 109003691 A | 10/2020 |
| JP | S59-502102 | 12/1984 |
| JP | 2005-187220 A | 7/2005 |
| JP | 4381179 B2 | 10/2009 |
| JP | 2010190720 A | 9/2010 |
| JP | 2012-503058 A | 2/2012 |
| JP | 2014141362 A | 8/2014 |
| JP | 5785675 B2 | 7/2015 |
| WO | 2012/002456 A1 | 8/2013 |

OTHER PUBLICATIONS

CN103474114B—Translation: Publication of CN103474114B—Mar. 23, 2016.
CN106629854B—Translation: Publication of CN106629854B—Dec. 15, 2017.
CN109003691A—Translation: Publication of CN109003691B—Oct. 9, 2020.
CN109592714A—Translation: Publication of CN109592714A—Apr. 9, 2019.
JP4381179B2—Translation: Publication of JP4381179B2—Dec. 9, 2009.
JP5783528B2—Translation: Publication of JP5783528B2—Sep. 24, 2015.
JP5785675B2—Translation: Publication of JP5785675B2—Sep. 30, 2015.
JP2001091687A—Translation: Publication of JP2001091687A—Apr. 6, 2001.
JP2001166086A—Translation: Publication of JP2001166086A—Jun. 22, 2001.
JP2010190720A—Translation: Publication of JP2010190720A—Sep. 2, 2010.
JP2014141362A—Translation: Publication of JP2014141362A—Aug. 7, 2014.
Collins et al., Production of Depleted UO2 Kernels for the Advanced Gas-Cooled Reactor Program for Use in Triso Coating Development, Oak Ridge National Laboratory, 2004.
Haas, "Resin-Based Preparation of HTGR Fuels: Operation of an Engineering-Scale Uranium Loading System," Oak Ridge National Laboratory, 1977.
Perevalov et al., "Microwave-assisted dissolution of ceramic uranium dioxide in TBP—HNO3 complex," J Radioanal Nucl Chem. published online Jun. 1, 2013.
Office Action issued for corresponding Japanese Patent Application No. 2022-524657 dated Jun. 6, 2023.
EPO Patent Translation of CN106564956A printed Jun. 7, 2021; 7 pgs.
Espacenet Abstract of CN106564956A printed Jul. 6, 2021; 1 pg.
Notification of Transmittal of the International Search Report and the Written Opinion of The International Searching Authority, or The Declaration re: PCT/US2020/058892, filed Nov. 4, 2020; 9 pgs.
Oh Seung-cheol, et al., "Sol-Gel Technology for UO 2 Fuel Core Manufacturing with High-Temperature Gas," Korea Atomic Energy Research Institute, dated Sep. 2005; 59 pgs. (Translation of Oh et al., "Sol-Gel Technology for the Preparation of UO2 Fuel Kernel for HTGR," dated Sep. 2005).

(Continued)

*Primary Examiner* — Steven J Bos
(74) *Attorney, Agent, or Firm* — Kramer & Amado, P.C.

(57) ABSTRACT

A solution of acid deficient uranyl nitrate has a formula of $UO_2(OH)_y(NO_3)_{2-y}$, where y ranges from 0.1 to 0.5. The solution is prepared by placing $U_xO_z$ in aqueous nitric acid to produce a uranium solution, wherein x is 1 to 3 and z is 2 to 8; placing the uranium solution under a pressure greater than atmospheric pressure in a sealed reaction chamber; and heating the uranium solution to a desired temperature of between 150° C. and 250° C. by applying microwave energy to the uranium solution. The uranium solution is maintained at the desired temperature under a pressure of from 5 atmospheres to 40 atmospheres for a hold time of 15 minutes to 6 hours to produce the desired acid deficient uranyl nitrate.

19 Claims, No Drawings

(56) References Cited

OTHER PUBLICATIONS

"Sol-Gel Technology for the Preparation of UO2 Fuel Kernel for HTGR;" dated Sep. 2005; 69 pgs.

KyungChai Jeong, et al., "ADU Compound Particle Preparation for HTGR Nuclear Fuel in Korea;" J. Ind. Eng, vol. 13; Mar. 20, 2007; No. 5; pp. 744-750.

KyungChai Jeong, et al., "Spherical UO3 Gel Preparation Using the External Gelation Method," Journal of the Korean Ceramic Society vol. 42, No. 11, pp. 729-736, 2005.

PREPARATION OF ACID-DEFICIENT URANYL NITRATE SOLUTIONS

STATEMENT OF GOVERNMENT SUPPORT

This invention was made with government support under Grant No. DE-NE0008472 awarded by the Department of Energy. The government has certain rights in the invention.

FIELD

This disclosure relates generally to the manufacture of uranyl nitrate solutions.

BACKGROUND

Acid-deficient uranyl nitrate (ADUN) solutions are important in internal-gelation processes for preparation of uranium oxide microspheres for use in manufacture of nuclear fuel. Under acid-deficient conditions and at high uranium concentrations, uranium oxide hydrolysis reactions are slow, and preparation of acid-deficient uranyl nitrate solutions takes an extended period of time.

SUMMARY

Various embodiments disclosed herein relate to a method of preparing a solution of acid deficient uranyl nitrate having a formula of $UO_2(OH)_y(NO_3)_{2-y}$, where y ranges from 0.1 to 0.5. The method comprises:
  dissolving a uranium oxide, e.g., $U_xO_z$ in aqueous nitric acid to produce a uranium solution, wherein x is 1 to 3 and z is 2 to 8;
  placing the uranium solution under a pressure greater than atmospheric pressure, a pressure of 5 to 40 atmospheres, a pressure of 5 to 20 atmospheres, or a pressure of 10 to 40 atmospheres in a sealed reaction chamber;
  heating the uranium solution to a desired holding temperature of between 150° C. and 250° C. by applying microwave energy or an electric heater to the uranium solution;
  maintaining the uranium solution at the desired temperature in the sealed vessel under a pressure greater than atmospheric pressure for a desired hold time;
  reducing the pressure on the uranium solution while maintaining the holding temp; and
  reducing the desired temperature to below 100° C. to obtain an acid deficient uranyl nitrate solution.

Various embodiments disclosed herein relate to a method of preparing a solution of acid deficient uranyl nitrate by:
  dissolving a uranium oxide, e.g., $U_xO_z$, in aqueous nitric acid to produce a uranium solution, wherein x is 1 to 3 and z is 2 to 8;
  placing the uranium solution under a pressure of 5 to 40 atmospheres in a sealed reaction chamber;
  heating the uranium solution to a desired holding temperature of between 150° C. and 250° C. by applying microwave energy or an electric heater to the uranium solution while allowing pressure to increase;
  maintaining the uranium solution at the desired holding temperature in the sealed vessel for a desired hold time;
  reducing the pressure on the uranium solution while maintaining the holding temp; and
  reducing the desired temperature to below 100° C. to obtain an acid deficient uranyl nitrate solution.

In various embodiments, a nitrate salt of a uranium oxide, e.g., dioxouranium nitrate $[UO_2(NO_3)_2]$, may be used as a starting material, where the starting nitrate salt is not acid deficient.

During the step of heating the uranium solution to a desired temperature of between 150° C. and 250° C., pressure in the sealed reaction chamber may increase from 5 to 40 atmospheres to between 10 and 70 atmospheres, from 15 to 60 atmospheres, from 20 to 50 atmospheres, or from 30 to 50 atmospheres.

During the step of reducing the pressure on the uranium solution, the pressure may be partially reduced while maintaining the solution at the desired holding temperature under a pressure which prevents boiling. After this step, the temperature of the uranium solution is reduced to below 100° C., e.g., 20° C. to 90° C., 30° C. to 95° C., 40° C. to 90° C., 50° C. to 85° C., 60° C. to 90° C., or about 80° C. The remaining pressure on the solution may then be reduced to about 1 atmosphere.

In various embodiments, $U_xO_z$ is dissolved in aqueous nitric acid. The uranium compound $U_xO_z$ may be $UO_2$, $UO_3$, or $U_3O_8$.

In various embodiments, the acid deficient uranyl nitrate solution produced from $U_xO_z$ by the method disclosed herein has a uranium concentration of from 0.5 M to 3 M and a density of 1.15 g/cm³ to 1.95 g/cm³; a uranium concentration of from 1 M to 3 M and a density of 1.30 g/cm³ to 1.95 g/cm³; a uranium concentration of from 2 M to 3 M and a density of 1.55 g/cm³ to 1.95 g/cm³; or a uranium concentration of from 2.7 M to 3 M and a density of 1.75 g/cm³ to 1.95 g/cm³.

The concentration of the acid deficient uranyl nitrate solution after digestion may be from 1 M to 3 M, from 2 M to 3 M, from 2.5 M to 3 M, or from 2.7 M to 3 M. The pH of the acid deficient uranyl nitrate solution after digestion is dependent on the uranium concentration and the $NO_3$:U molar ratio. At a $NO_3$:U ratio of 1.5 to 1.7 and a uranium concentration of from 2.7 M to 3.0 M, the pH may be from 1.2 to 1.4.

In various embodiments, the acid deficient uranyl nitrate solution produced by the method disclosed herein has:
  a $NO_3$:U ratio of 1.5 to 1.9, a uranium concentration of from 0.5 M to 3.5 M, and a pH of 0.5 to 2.8;
  a $NO_3$:U ratio of 1.5 to 1.7; a uranium concentration of from 0.5 M to 3.5 M; and a pH of 0.8 to 2.8;
  a $NO_3$:U ratio of 1.5 to 1.9; a uranium concentration of from 2.5 M to 3.0 M; and a pH of less than 1.8; or
  a $NO_3$:U ratio of 1.5 to 1.7; a uranium concentration of from 2.5 M to 3.0 M; and a pH of 1.2 to 1.8.

In various embodiments, the acid deficient uranyl nitrate solution produced by the methods disclosed herein is maintained at an elevated temperature of between 200° C. and 250° C. under a pressure of from 20 atmospheres to 50 atmospheres; or under a pressure of from 30 atmospheres to 45 atmospheres at an elevated temperature of between 215° C. and 240° C. The acid deficient uranyl nitrate solution is held at the desired pressure and temperature for between 30 min and 2 hours. At the end of this time, the elevated temperature is maintained while the pressure on the uranyl nitrate solution is partially reduced. The partially reduced pressure is sufficiently high to prevent the solution from boiling at the elevated temperature. The elevated temperature then is reduced to between 30° C. and 90° C., or between 60° C. and 90° C., or about 80° C. before reducing the pressure on the uranium solution to atmospheric pressure. The uranium solution may then be removed from the pressure vessel.

Various embodiments disclosed herein relate to a method of preparing a solution of acid deficient uranyl nitrate having a formula of $UO_2(OH)_y(NO_3)_{2-y}$, where y ranges from 0.1 to 0.5, by: dissolving a nitrate salt of an oxygenated uranium ion, e.g., $UO_2(NO_3)_2$ or a hydrate thereof, in aqueous nitric acid to produce a uranium solution;

placing the uranium solution under a pressure greater than atmospheric pressure in a sealed reaction chamber;

heating the uranium solution to a desired temperature of between 150° C. and 250° C. by applying microwave energy to the uranium solution;

maintaining the uranium solution at the desired temperature under elevated pressure for a desired hold time;

partially venting the pressure on the uranium solution without allowing the uranium solution to boil; and reducing the desired temperature to below 100° C. and reducing the pressure on the uranium solution to atmospheric pressure to obtain an acid deficient uranyl nitrate solution.

In various embodiments, the acid deficient uranyl nitrate solution produced from $UO_2(NO_3)_2$ by the method disclosed herein has:

a uranium concentration of from 0.5 M to 3 M and a density of 1.15 g/cm³ to 1.95 g/cm³;

a uranium concentration of from 1 M to 3 M and a density of 1.30 g/cm³ to 1.95 g/cm³;

a uranium concentration of from 2 M to 3 M and a density of 1.55 g/cm³ to 1.95 g/cm³; or a uranium concentration of from 2.7 M to 3 M and a density of 1.75 g/cm³ to 1.95 g/cm³.

In various embodiments, the acid deficient uranyl nitrate solution produced from $UO_2(NO_3)_2$, by the method disclosed herein has:

a $NO_3$:U ratio of 1.5 to 1.9 and a pH of 0.5 to 2.8;

a $NO_3$:U ratio of 1.5 to 1.7 and a pH of 0.8 to 2.8;

a $NO_3$:U ratio of 1.5 to 1.9 and a pH of less than 1.8; or a $NO_3$:U ratio of 1.5 to 1.7 and a pH of 1.2 to 1.8.

DETAILED DESCRIPTION

Various embodiments disclosed herein are directed to a method of making an acid-deficient solution of uranyl nitrate having the formula $UO_2(OH)_y(NO_3)_{2-y}$, where 0.1<y<0.5, 0.2<y<0.5, or 0.3<y<0.5. The mole ratio of nitrate ions to uranium ions in the uranium compound should be from 1.5 to 1.9, from 1.5 to 1.8, or from 1.5 to 1.7.

The present disclosure describes techniques for preparing acid deficient uranyl nitrate solutions in less than six hours, from 0.5 to 5 hours, from 0.5 to 3 hours, from 0.5 to 2 hours, or from 1 to 3 hours.

The method includes a first step of preparing a solution of uranium(VI) in aqueous nitric acid. The uranium may be provided as an oxide. If the uranium is provided as a uranium oxide, the oxide may be the formula $U_xO_z$, where x is 1-3 and z is 2 to 8. In various embodiments, the oxide may be $UO_2$, $UO_3$, $U_3O_8$, or a mixture thereof.

In various embodiments, the appropriate mass of a uranium compound, which may be an oxide of uranium(IV) or uranium(VI), is measured and placed in a digestion vessel. The uranium compound may be provided as a powder. An aqueous solution of nitric acid is added to the digestion vessel, in an amount such that the molar ratio of nitrate ions to uranium ions in the solution ranges from 1.5 to 2.0, from 1.5 to 1.9, from 1.6 to 1.8, from 1.5 to 1.7, or from 1.55 to 1.7.

In some cases, the molar ratio of nitrate ions to uranium ions in the solution may exceed the molar ratio of nitrate ions to uranium ions in the desired product. For example, where the uranium an oxide of uranium(IV) or uranium(V), a portion of the nitric acid may be consumed by oxidation of uranium to uranium(VI). For example, the majority of the uranium, e.g., >50%, >60%, or ≥70% of the uranium, in $U_3O_8$ is uranium(V) and uranium (IV). When preparing acid deficient uranyl nitrate from $U_3O_8$, a portion of the nitric acid may be consumed by oxidation of uranium(V) to uranium(VI). Thus, to make a solution of acid deficient uranyl nitrate where the mole ratio of nitrate to uranium is 1.7, a starting solution of $U_3O_8$ in aqueous nitric acid may require a ratio of nitric acid to uranium atoms of about 1.85 to 1.9. Since uranium trioxide contains mostly uranium(VI), acid deficient uranyl nitrate with a mole ratio of nitrate to uranium of 1.7 may be prepared using a starting solution with a ratio of nitric acid to uranium atoms of about 1.7.

An amount of deionized water is then added to the digestion vessel. The water should be added in an amount such that the concentration of uranium ions upon dissolution ranges from 0.25 M to 3.5 M, from 1 M to 3 M, from 1.5 to 3 M, or from 2.5 to 3 M.

Table 1 shows the amount of the reagents required to make an acid deficient uranyl nitrate solution, at various $NO_3$:U ratios ranging from 1.5 to 1.9 and a uranium ion concentration of 1 M. In such embodiments, a uranium compound is place in a digestion vessel in an amount such that one mole of uranium atoms per liter of the final solution is present in the digestion vessel. The amount of uranium compound to be used may be determined by dividing the molar mass of the compound by the number of uranium atoms in the empirical formula of the compound. Thus, if $UO_2$ is used as a uranium compound, one mole of the oxide per liter may be used. However, if $U_3O_8$ is used as a uranium compound, one third mole of the oxide per liter should be used. To produce a 1 M uranium nitrate solution with a $NO_3$:U ratio of 1.5, a nitric acid solution should be added in an amount such that 1.5 moles nitric acid are present per liter of the final solution. If a concentrated aqueous solution containing 70% by weight nitric acid is used, 95 ml 70% $HNO_3$ should be added to the digestion vessel for each liter of the final solution. If a different uranium concentration in the final solution is desired without changing the $NO_3$:U ratio, the amount of uranium compound and the amount of nitric acid should each be scaled appropriately. If a different $NO_3$:U ratio in the final solution is desired without changing the uranium concentration, the amount of the amount of nitric acid should be scaled appropriately without altering the amount of uranium compound. The uranium concentration and the $NO_3$:U ratio may each be independently adjusted.

Where an oxide of uranium is used as the uranium source, the initial mixture of uranium oxide and aqueous nitric acid is a slurry of uranium oxide and acid. As the uranium oxide reacts with nitric acid to produce uranyl nitrate, the concentration and pH changes until the reaction is complete and an acid deficient uranyl nitrate solution is obtained.

The digestion vessel is then placed in a pressure vessel in a microwave digestion system or electrical resistance heating apparatus. The pressure vessel is sealed and pressurized with an inert gas. The inert gas may be nitrogen or argon. The pressure vessel is pressurized to a desired pressure which is greater than atmospheric pressure, and may be from 2 to 100 atmospheres, from 4 to 50 atmospheres, from 5 to 40 atmospheres, or from 8 to 20 atmospheres.

Microwaves or electrical power are applied to the pressure vessel to heat the reaction mixture in the digestion vessel. In various embodiments, a slightly acidic base load, e.g., an aqueous solution containing 3% by weight nitric acid, may be present in the pressure vessel, with the digestion vessel being surrounded by the base load. In such embodiments, microwaves are applied to the pressure vessel to heat the base load, where the base load in turn heats the reaction mixture. Microwaves are applied until a desired temperature is achieved. The solution is heated at a rate of from 3° C./min to 20° C./min, 4° C./min to 15° C./min, or 5° C./min to 10° C./min. Once the reaction mixture and/or the base load reaches the desired temperature, the power of the microwaves applied to the reaction mixture is regulated to maintain the temperature of the reaction mixture at the desired temperature for a desired hold time.

TABLE 1

Preparation of acid-deficient uranyl nitrate solutions.

| NO$_3$:U Ratio | Uranium Compound | Uranium Compound Required for Solution (g/l) | | 70% Nitric Acid Required for Solution (ml 70% HNO$_3$/l) | | Solution pH | |
|---|---|---|---|---|---|---|---|
| | | 1M U(VI) | 3M U(VI) | 1M U(VI) | 3M U(VI) | 1M U(VI) | 3M U(VI) |
| 1.5 | UO$_2$ | 270 | 810 | 95 | 285 | ~2.7 | ~1.6 |
| 1.7 | UO$_2$ | 270 | 810 | 108 | 324 | ~2.4 | ~1.3 |
| 1.9 | UO$_2$ | 270 | 810 | 120 | 360 | ~1.8 | ~1.2 |
| 1.5 | UO$_3$ | 286 | 858 | 95 | 285 | ~2.7 | ~1.6 |
| 1.7 | UO$_3$ | 286 | 858 | 108 | 324 | ~2.4 | ~1.3 |
| 1.9 | UO$_3$ | 286 | 858 | 120 | 360 | ~1.8 | ~1.2 |
| 1.5 | U$_3$O$_8$ | 281 | 843 | 95 | 285 | ~2.7 | ~1.6 |
| 1.7 | U$_3$O$_8$ | 281 | 843 | 108 | 324 | ~2.4 | ~1.3 |
| 1.9 | U$_3$O$_8$ | 281 | 843 | 120 | 360 | ~1.8 | ~1.2 |
| 1.5 | UO$_2$(NO$_3$)$_2$ | 394 | 1,182 | 95 | 285 | ~2.7 | ~1.6 |
| 1.7 | UO$_2$(NO$_3$)$_2$ | 394 | 1,182 | 108 | 324 | ~2.4 | ~1.3 |
| 1.9 | UO$_2$(NO$_3$)$_2$ | 394 | 1,182 | 120 | 360 | ~1.8 | ~1.2 |

In various embodiments, the desired temperature is between 120° C. and 300° C., between 140° C. and 275° C., between 150° C. and 250° C., between 160° C. and 225° C., or between 170° C. and 200° C. The uranium solution may be maintained at the desired temperature under a pressure of from 10 and 70 atmospheres, from 15 to 60 atmospheres, from 20 to 50 atmospheres, or from 30 to 50 atmospheres for a desired hold time, where the desired hold time is from 15 minutes to 6 hours. The uranium solution may be maintained at the desired temperature for a hold time ranging from 0.5 to 3 hours, from 0.5 to 2 hours, or from 0.75 to 1.5 hours.

At the end of the hold time, the applied microwaves are turned off. Then the system will be allowed to degas by releasing the pressure inside the pressure vessel while maintaining the desired temperature. The pressure will be allowed to reduce to a pressure which is greater than the vapor pressure of the solution at the desired temperature, thereby preventing the solution from boiling. The reaction chamber will then be allowed to cool to a temperature below 100° C., a temperature of 30° C. to 90° C., a temperature of 60° C. to 90° C., or a temperature of about 80° C. The pressure in the pressure vessel is released at a controlled rate.

Once the system reaches atmospheric pressure, the digestion vessel is removed from the pressure vessel. The acid deficient uranyl nitrate solution is removed from the reaction chamber. To determine if the formation of the acid deficient uranyl nitrate solution is complete, the density and pH of the solution are measured.

The density of an acid deficient uranyl nitrate solution ($\varrho$[ADUN]) is dependent on the density of water ($\varrho$[H$_2$O]), the uranium concentration U (mol/l), and the nitrate concentration N (mol/l), by equation (1):

$$\varrho_{[ADUN]} = \varrho_{[H_2O]} + 0.27U + 0.028N \quad (1)$$

Since the uranium and nitrate concentrations are known, the correct density for an acid deficient uranyl nitrate solution can be calculated from Equation (1). For example, a 1 M uranyl nitrate solution with a NO$_3$:U ratio of 1.5 should have a density of 1.31 M. In various embodiments where the acid deficient uranyl nitrate solution has a NO$_3$:U ratio of 1.5 to 1.7, the density of an acid deficient uranyl nitrate solution (Q[ADUN]) is approximately represented by equation (2):

$$\varrho_{[ADUN]} = \varrho_{[H_2O]} + 0.31U \quad (2)$$

Theoretically, if the concentration of uranium in the acid deficient uranyl nitrate solution is between 2.7 M and 3 M, the solution density should range from 1.837 to 1.93 g/cm$^3$, based on equation (2). A solution with a concentration of uranium between 2.7 M and 3 M and a density of between 1.75 and 1.95 g/cc is acceptable for use in preparation of uranium oxide microspheres. The pH of an acid deficient uranyl nitrate solution pH with a uranium concentration between 2.7 M and 3 M should be between 1.2 to 1.4. Acid deficient uranyl nitrate solution with similar uranium concentrations and pH values may be achieved by traditional means, under ambient pressure, e.g. by processing at 20° C. to 70° C. at atmospheric pressure. However, the time required to prepare such solutions is typically measured in days. The technique disclosed herein alloys preparation of the acid deficient uranyl nitrate solutions in less than six hours, from 0.25 to 5 hours, from 0.5 to 4 hours, from 0.5 to 3 hours, from 0.5 to 2 hours, or from 1 to 3 hours.

The process disclosed herein allows making acid deficient uranyl nitrate solutions at elevated pressures and temperatures. Temperature of the solution can be increased using a variety of heating elements, including radiant or conductive heating elements. Temperature can be increased using microwaves to heat the solution. The pressure can be delivered by an external pressure and/or as a result of increasing the vapor pressure of the working fluid (i.e. the ADUN solution) during heating. The uranium oxide/nitric acid slurry may be placed under elevated pressure by placing the mixture under an inert pressurized atmosphere at low temperature, and further increasing pressure by heating the solution to increase its vapor pressure.

In various embodiments, the acid deficient uranyl nitrate solution has a $NO_3:U$ ratio of 1.5, with a uranium concentration of from 0.5 M to 3.5 M and a pH of 1.4 to 2.9, a uranium concentration of from 1 M to 3 M and a pH of 1.6 to 2.7, a uranium concentration of from 2 M to 3 M and a pH of 1.7 to 2.2, or a uranium concentration of from 2.7 M to 3 M and a pH of 1.7 to 1.9.

In various embodiments, the acid deficient uranyl nitrate solution has a $NO_3:U$ ratio of 1.6, with a uranium concentration of from 0.5 M to 3.5 M and a pH of 1.24 to 2.75, a uranium concentration of from 1 M to 3 M and a pH of 1.3 to 2.5, a uranium concentration of from 2 M to 3 M and a pH of 1.4 to 2, or a uranium concentration of from 2.7 M to 3 M and a pH of 1.4 to 1.6.

In various embodiments, the acid deficient uranyl nitrate solution has a $NO_3:U$ ratio of 1.7, with a uranium concentration of from 0.5 M to 3.4 M and a pH of 0.8 to 2.6, a uranium concentration of from 1 M to 3 M and a pH of 1.6 to 2.4, a uranium concentration of from 2 M to 3 M and a pH of 1.2 to 1.8, or a uranium concentration of from 2.7 M to 3 M and a pH of 1.2 to 1.4. In various embodiments, the acid deficient uranyl nitrate solution has a $NO_3:U$ ratio of 1.5 to 1.9; a uranium concentration of from 0.5 M to 3.5 M; and a pH of 0.5 to 2.8.

In various embodiments, the acid deficient uranyl nitrate solution has a $NO_3:U$ ratio of 1.5 to 1.7; a uranium concentration of from 0.5 M to 3.5 M; and a pH of 0.8 to 2.8.

EXAMPLES

Comparative Example 1

32.3 mL of 70% nitric acid is added to a vessel containing 23 mL of distilled water. The vessel is heated to 60° C. and 76 g of $U_3O_8$ are added in increments of 25%, 25%, 25%, 10%, 10%, and 5% over the course of 6 days. The vessel is continuously kept at 60° C. and stirred over the course of this 6-day period. Distilled water is added over the course of the 6-day period to keep the volume of the reaction mixture constant in the reactor vessel and prevent precipitation. The vessel is cooled to 20° C., and allowed to equilibrate for another 24 hours. After 24 hrs, the density and pH are tested, and distilled water is added if necessary. The uranyl nitrate solution is removed and filtered to remove unreacted uranium oxides.

Example 1

6 g of $U_3O_8$ (7.13 mmol $U_3O_8$; 21.4 mmol U) are added to 1.8 to 3 ml of distilled water to form a uranium oxide slurry. The uranium oxide slurry is mixed, and 1.3 to 2.5 mL of 70% Nitric Acid are added. The uranium oxide slurry is again mixed, and placed in an acid digester. The water to $U_3O_8$ mass ratio ranges from 0.3 to 0.5. The nitric acid to $U_3O_8$ mass ratio ranges from 0.3 to 0.6. The digestion vessel is pressurized to 5 to 40 bar with argon and heated to between 200° C. to 250° C. This temperature is maintained for 30 to 120 min. At the end of this time, the system is degassed to partially vent pressure, while remaining at a temperature between 200° C. to 250° C. and a pressure above the vapor pressure of the heated digested solution to prevent boiling. After partially venting pressure, the temperature is reduced to 30° C. The pressure is reduced to atmospheric pressure, and the product uranyl nitrate solution is unloaded.

Example 2

6 g of $U_3O_8$ (7.13 mmol ILOs; 21.4 mmol U) are added to 3 ml distilled water. The $U_3O_8$ and water are mixed, and 2.5 mL 70% nitric acid (15.8 M aqueous $HNO_3$; 39.52 mmol $HNO_3$; 2.49 g $HNO_3$) is added and the resulting solution is mixed and placed in an acid digester. The nitric acid to $U_3O_8$ mass ratio is 0.5. The nitric acid to $U_3O_8$ mole ratio is 1.85. The vessel is sealed and pressurized to between 5 bar and 40 bar with argon, and heated with microwaves to between 200° C. to 250° C., with the temperature being increased at a ramp rate of 3° C./min to 20° C./min. The temperature is then maintained at between 200° C. to 250° C. for between 30 and 120 min. At the end of this time, the system is degassed to vent pressure, while remaining at a pressure above the vapor pressure of the digested solution to prevent boiling. This may be done by maintaining the temperature to 200° C. to 250° C., while partially reducing the pressure to a pressure which exceeds the vapor pressure of the digested solution at between 200° C. to 250° C. After partially reducing the pressure, the solution temperature is reduced to 30° C. The pressure is reduced to 1 atmosphere, and the product uranyl nitrate solution is unloaded.

Example 3

400 g of $U_3O_8$ (0.48 mol $U_3O_8$; 1.44 mol U) are added to 194 ml distilled water. The $U_3O_8$ and water are mixed and 170 mL 70% nitric acid (15.8 M aqueous $HNO_3$; 2.69 mol $HNO_3$) is added to the uranium solution, and the resulting solution is mixed and placed in an acid digester. The nitric acid to $U_3O_8$ mass ratio is 0.42. The nitric acid to $U_3O_8$ mol ratio is ~1.87. The vessel is sealed and pressurized to 30 bar with argon and heated with microwaves to 230° C., with the temperature being increased at a ramp rate of 3° C./min to 20° C./min. The temperature is then maintained at between 230° C. for 60 minutes. At the end of this time, the system is degassed to vent pressure to 35 bar. The temperature is reduced to 30° C., the remaining pressure is vented, and the product uranyl nitrate solution is removed from the vessel and may be filtered to remove unreacted uranium oxides.

Example 4

6 g of $UO_2$ are added to 1.8 to 3 ml of distilled water to form a uranium oxide slurry. The uranium oxide slurry is mixed, and 1.3 to 2.5 mL of 70% nitric acid are added. The uranium oxide slurry is again mixed, and placed in an acid digester. The water to $UO_2$ mass ratio ranges from 0.3 to 0.5. The nitric acid to $UO_2$ mass ratio ranges from 0.3 to 0.6. The digestion vessel is pressurized to 5 to 40 bar with argon and heated to between 200° C. to 250° C. This temperature is maintained for 30 to 120 min. At the end of this time, the system is degassed to partially vent pressure, while remaining at a temperature between 200° C. to 250° C. and a pressure above the vapor pressure of the heated digested solution to prevent boiling. After partially venting pressure, the temperature is reduced to 30° C. The pressure is reduced to atmospheric pressure, and the product uranyl nitrate solution is unloaded. If the density and pH levels are not as desired, repeat procedure.

Although the various embodiments have been described in detail with particular reference to certain exemplary aspects thereof, it should be understood that the invention is capable of other embodiments and its details are capable of modifications in various respects. As is readily apparent to those skilled in the art, variations and modifications can be affected while remaining within the spirit and scope of the invention. Accordingly, the foregoing disclosure and description are for illustrative purposes only and do not in any way limit the invention, which is defined only by the claims.

What is claimed is:

1. A method of preparing a solution of acid deficient uranyl nitrate having a formula of $UO_2(OH)_y(NO_3)_{2-y}$, where y ranges from 0.1 to 0.5, the method comprising:
    a) dissolving $U_xO_z$ in aqueous nitric acid to produce a uranium solution, wherein x is 1 to 3 and z is 2 to 8;
    b) placing the uranium solution under a pressure greater than atmospheric pressure in a sealed reaction chamber;
    c) heating the uranium solution to a desired temperature of between 150° C. and 250° C. by applying microwave energy to the uranium solution;
    d) maintaining the uranium solution at the desired temperature under elevated pressure for a desired hold time;
    e) partially venting the pressure on the uranium solution without allowing the uranium solution to boil; and
    f) reducing the desired temperature to below 100° C. and reducing the pressure on the uranium solution to atmospheric pressure to obtain an acid deficient uranyl nitrate solution.

2. The method of claim 1, wherein $U_xO_z$ is dissolved in aqueous nitric acid.

3. The method of claim 1, wherein $U_xO_z$ is $UO_2$, $UO_3$, or $U_3O_8$.

4. The method of claim 1, wherein the acid deficient uranyl nitrate solution has a uranium concentration of from 0.5 M to 3 M and a density of 1.15 g/cm³ to 1.95 g/cm³.

5. The method of claim 1, wherein the acid deficient uranyl nitrate solution has a uranium concentration of from 1 M to 3 M and a density of 1.30 g/cm³ to 1.95 g/cm³.

6. The method of claim 1, wherein the acid deficient uranyl nitrate solution has a uranium concentration of from 2 M to 3 M and a density of 1.55 g/cm³ to 1.95 g/cm³.

7. The method of claim 1, wherein the acid deficient uranyl nitrate solution has a uranium concentration of from 2.5 M to 3 M and a density of 1.75 g/cm³ to 1.95 g/cm³.

8. The method of claim 1, wherein the acid deficient uranyl nitrate solution has a $NO_3$:U ratio of 1.5 to 1.9; a uranium concentration of from 0.5 M to 3.5 M; and a pH of 0.5 to 2.8.

9. The method of claim 1, wherein the acid deficient uranyl nitrate solution has a $NO_3$:U ratio of 1.5 to 1.7; a uranium concentration of from 0.5 M to 3.5 M; and a pH of 0.8 to 2.8.

10. The method of claim 1, wherein the acid deficient uranyl nitrate solution has a $NO_3$:U ratio of 1.5 to 1.9; a uranium concentration of from 2.5 M to 3.0 M; and a pH of less than 1.8.

11. The method of claim 1, wherein the acid deficient uranyl nitrate solution has a $NO_3$:U ratio of 1.5 to 1.7; a uranium concentration of from 2.5 M to 3.0 M; and a pH of 1.2 to 1.8.

12. The method of claim 1, wherein the uranium solution is maintained at the desired temperature under a pressure of from 20 to 50 atmospheres for a desired hold time, wherein the desired temperature is between 200° C. and 250° C.

13. The method of claim 1, wherein the uranium solution is maintained at the desired temperature under a pressure of from 20 to 50 atmospheres for a desired hold time, wherein the desired temperature is between 215° C. and 240° C.

14. The method of claim 13, wherein the desired hold time is 15 min to 6 hours.

15. The method of claim 13, wherein the desired hold time is 30 min to 2 hours.

16. The method of claim 1, wherein the desired temperature is reduced to between 30° C. and 90° C. before reducing the pressure on the uranium solution to atmospheric pressure.

17. A method of preparing a solution of acid deficient uranyl nitrate having a formula of $UO_2(OH)_y(NO_3)_{2-y}$, where y ranges from 0.1 to 0.5, the method comprising:
    a) dissolving $UO_2(NO_3)_2$ or a hydrate thereof in aqueous nitric acid to produce a uranium solution;
    b) placing the uranium solution under a pressure greater than atmospheric pressure in a sealed reaction chamber;
    c) heating the uranium solution to a desired temperature of between 150° C. and 250° C. by applying microwave energy to the uranium solution;
    d) maintaining the uranium solution at the desired temperature under elevated pressure for a desired hold time;
    e) partially venting the pressure on the uranium solution without allowing the uranium solution to boil; and
    f) reducing the desired temperature to below 100° C. and reducing the pressure on the uranium solution to atmospheric pressure to obtain an acid deficient uranyl nitrate solution.

18. A method of preparing a solution of acid deficient uranyl nitrate having a formula of $UO_2(OH)_y(NO_3)_{2-y}$, where y ranges from 0.1 to 0.5, the method comprising:
    a) dissolving $U_xO_z$ in aqueous nitric acid to produce a uranium solution, wherein x is 1 to 3 and z is 2 to 8;
    b) placing the uranium solution under a pressure under a pressure of from 20 to 50 atmospheres in a sealed reaction chamber;
    c) heating the uranium solution by applying microwave energy to the uranium solution;
    d) maintaining the uranium solution at the desired temperature under elevated pressure for a desired hold time of between 15 min and 6 hours;
    e) partially venting the pressure on the uranium solution without allowing the uranium solution to boil; and
    f) reducing the desired temperature to below 100° C. and reducing the pressure on the uranium solution to atmospheric pressure to obtain an acid deficient uranyl nitrate solution.

19. The method of claim 18, wherein the step of heating the uranium solution comprises heating the uranium solution to a temperature of between 150° C. and 250° C. by applying microwave energy to the uranium solution.

* * * * *